(12) United States Patent
Sabhapathy et al.

(10) Patent No.: US 9,091,249 B2
(45) Date of Patent: Jul. 28, 2015

(54) INTEGRATED COOLING AND CLIMATE CONTROL SYSTEM FOR AN OFFSHORE WIND TURBINE

(75) Inventors: Peri Sabhapathy, Sarriguren (ES); Eduardo Moreno Benito, Sarriguren (ES); Dag Jorstad, Sarriguren (ES)

(73) Assignee: GAMES INNOVATION & TECHNOLOGY, S.L., Sarriguren (ES)

( * ) Notice: Subject to any disclaimer, the term of this patent is extended or adjusted under 35 U.S.C. 154(b) by 582 days.

(21) Appl. No.: 13/489,086

(22) Filed: Jun. 5, 2012

(65) Prior Publication Data
US 2013/0319631 A1 Dec. 5, 2013

(51) Int. Cl.
F03D 11/00 (2006.01)
F28D 15/00 (2006.01)

(52) U.S. Cl.
CPC ............ F03D 11/0075 (2013.01); F03D 11/00 (2013.01); F05B 2260/20 (2013.01); F05B 2260/205 (2013.01); F28D 15/00 (2013.01); Y02E 10/722 (2013.01); Y02E 10/726 (2013.01)

(58) Field of Classification Search
CPC ....... F03D 1/00; F03D 11/00; F03D 11/0075; F05B 2260/205
USPC .................................................. 415/177, 178
See application file for complete search history.

(56) References Cited

U.S. PATENT DOCUMENTS

| 3,952,723 | A | * | 4/1976 | Browning ...................... 126/247 |
| 6,439,832 | B1 | | 8/2002 | Siegfriedsen |
| 6,520,737 | B1 | | 2/2003 | Fischer et al. |
| 7,291,936 | B1 | * | 11/2007 | Robson .......................... 290/43 |
| 2009/0094981 | A1 | * | 4/2009 | Eggleston .................... 60/641.2 |
| 2010/0061853 | A1 | | 3/2010 | Bagepalli |
| 2010/0133824 | A1 | | 6/2010 | Gao |
| 2012/0156053 | A1 | * | 6/2012 | Stiesdal ....................... 416/93 R |
| 2012/0257970 | A1 | * | 10/2012 | Akashi et al. ................... 416/95 |

FOREIGN PATENT DOCUMENTS

WO    2010/069954 A1    6/2010

* cited by examiner

*Primary Examiner* — Ninh H Nguyen
(74) *Attorney, Agent, or Firm* — Ladas & Parry LLP

(57) ABSTRACT

An integrated cooling and climate control system for an offshore wind turbine featuring a reservoir having first and second chambers located in an upper region of the tower. Upper and lower cooling circuits distribute coolant fluid through heat generating structures in the nacelle to a lower portion of the wind turbine where the heated coolant fluid is thermally connected to a sea water heat sink. The cooled coolant fluid is then distributed back to the reservoir. The reservoir has a hollow center and is positioned on a platform having a hollow center. The inlet and outlet pipes of the upper cooling circuit freely hang inside the reservoir chambers so that they may be displaced as the nacelle yaws in order to maintain sufficient circulation of the coolant fluid in the upper cooling circuit. In jacket foundation configurations, the tubular support structures may serve as the lower cooling circuit pipes.

14 Claims, 3 Drawing Sheets

INTEGRATED COOLING AND CLIMATE CONTROL SYSTEM FOR AN OFFSHORE WIND TURBINE

BACKGROUND OF THE INVENTION

1. Field of the Invention

The present invention generally relates to an integrated cooling and climate control system for an offshore wind turbine system.

2. Related Art

A wind turbine converts the kinetic energy of wind into electrical energy through its rotor, drivetrain, electrical generator, and converter. An electrical transformer converts the low voltage output from the converter into a high voltage output before the electricity is sent to the substation at the wind farm.

The wind turbine nacelle houses the mechanical and electrical components, namely the drivetrain, the electrical generator, the converter, and the transformer, and the components of the hydraulic system needed for blade pitching and nacelle yawing. These components generate a significant amount of heat when the wind turbine is operating. In order to ensure that the components continue to operate efficiently and do not overheat, the heat generated by these components must be continuously removed.

It is known in the art to cool the heat generating components inside a nacelle by circulating a coolant through heat exchangers built into each of these components. For instance, it is known to transfer the heat generated by the drivetrain and the hydraulic system to a coolant through liquid-to-liquid heat exchangers in the lubricating oil and the hydraulic sumps. The heat that is captured by the coolant is then dissipated to the ambient air by implementing air cooled radiators mounted on the outside of the nacelle. The air flow inside the nacelle over the heat generating components also helps cool the heat generating components. The ambient air usually enters through one or more inlets at the nacelle front bottom and the warmer air exits to the outside through outlets at the nacelle rear top. Outlet fans help the airflow through the nacelle and over the heat generating components.

SUMMARY OF THE INVENTION

While known systems use air as a heat sink for heat generating components in the nacelle, it is advantageous to use sea water as a heat sink in an offshore wind turbine because sea water is normally cooler than the ambient air and has a higher thermal conductivity and a higher heat capacity and is therefore a more effective heat sink. However, the wind turbine nacelle is adapted to yaw in order to align the rotor towards the wind to capture the maximum energy from the wind. The frequent yawing of the nacelle interferes with the circulation of the coolant from the nacelle to a heat exchanger, particularly on a lower portion of the turbine such as the tower bottom or the sea.

The present invention is directed to an integrated cooling and climate control system for an offshore wind turbine which overcomes the various drawbacks of conventional systems. The integrated cooling and climate control system uses sea water as a heat sink for releasing heat from the heat generating components in the nacelle and the nacelle air. The system is adapted to allow the nacelle to yaw as necessary while maintaining sufficient circulation of the coolant throughout the system.

The system features a reservoir positioned in an upper part of the wind turbine tower just below the nacelle. The reservoir has first and second chambers separated by a divider and has a hollow center. A series of pipes extend upwardly from the first chamber to form an upper cooling circuit. The integrated cooling and climate control system is adapted to distribute coolant fluid in the upper cooling circuit from the first chamber of the reservoir through the nacelle to the second chamber. The coolant fluid passes the heat generating structures in the nacelle such as the coolant-to-oil heat exchanger associated with the drivetrain, the generator, the converter, the coolant-to-hydraulic fluid heat exchanger associated with hydraulic fluid of the hydraulic system, one or more transformers, and the coolant-to-air heat exchanger which collects heat from the nacelle air. The coolant fluid extracts heat from each of these structures in the nacelle as the coolant passes these structures. The heated coolant then is distributed by the upper cooling circuit to the second chamber of the reservoir.

The system also features a lower cooling circuit formed by a series of pipes extending downwardly from the second chamber to a lower portion of the wind turbine. The heated coolant is transferred from the second chamber to the lower cooling circuit where the coolant passes a heat exchange zone comprising pipes thermally connected to sea water. The sea water serves as a heat sink and heat from the heated coolant is transferred to the sea water. The lower cooling circuit is adapted to then distribute the cooled coolant fluid upwardly to the first chamber of the reservoir where the coolant can then be distributed back to the upper cooling circuit.

The reservoir has a hollow center and a lid with an aligned hollow center. The system features a platform for supporting the reservoir. The platform has an aperture that is aligned with the hollow center of the reservoir and the corresponding aperture of the platform in order to provide an access path between the nacelle and the tower of the wind turbine.

The inlet and outlet pipes between the upper cooling circuit and the reservoir extend through openings in the reservoir lid and are adapted to freely hang inside the reservoir chambers so that the inlet and outlet pipes may be displaced as the wind turbine moves. The reservoir is configured so that its vertical axis and that of any associated lid are coincident with the nacelle yaw axis. The system is adapted so that when the nacelle yaws, the inlet and outlet pipes freely rotate inside their respective reservoir chambers along with the reservoir lid in order to maintain sufficient circulation of the coolant fluid in the upper cooling circuit.

In an alternative embodiment where the foundation of the wind turbine is a jacket foundation, the support structures of the foundation may serve as the pipes of the lower cooling circuit for the system. The sea water contacting the support structures serves as a heat sink for this embodiment of the system.

The system serves to effectively and efficiently remove heat from the nacelle air and heat generating structures in the nacelle and utilize sea water at the lower portion of the tower as a heat sink. The circulation of the coolant fluid is maintained as the nacelle yaws.

Further features and advantages of the present invention, as well as the structure and operation of various embodiments of the present invention, are described in detail below with reference to the accompanying drawings.

BRIEF DESCRIPTION OF THE DRAWINGS

The features and advantages of the present invention will be more readily understood from a detailed description of the exemplary embodiments taken in conjunction with the following figures.

The invention will next be described in connection with certain exemplary embodiments; however, it should be clear to those skilled in the art that various modifications, additions, and subtractions can be made without departing from the spirit and scope of the claims.

DETAILED DESCRIPTION OF THE PREFERRED EMBODIMENTS

As an initial comment, it is noted that the term "pipes" as used herein is non-limiting and refers to other conduits and like devices known in the art including coils, tubes, and other means known in the art.

Figure 1:
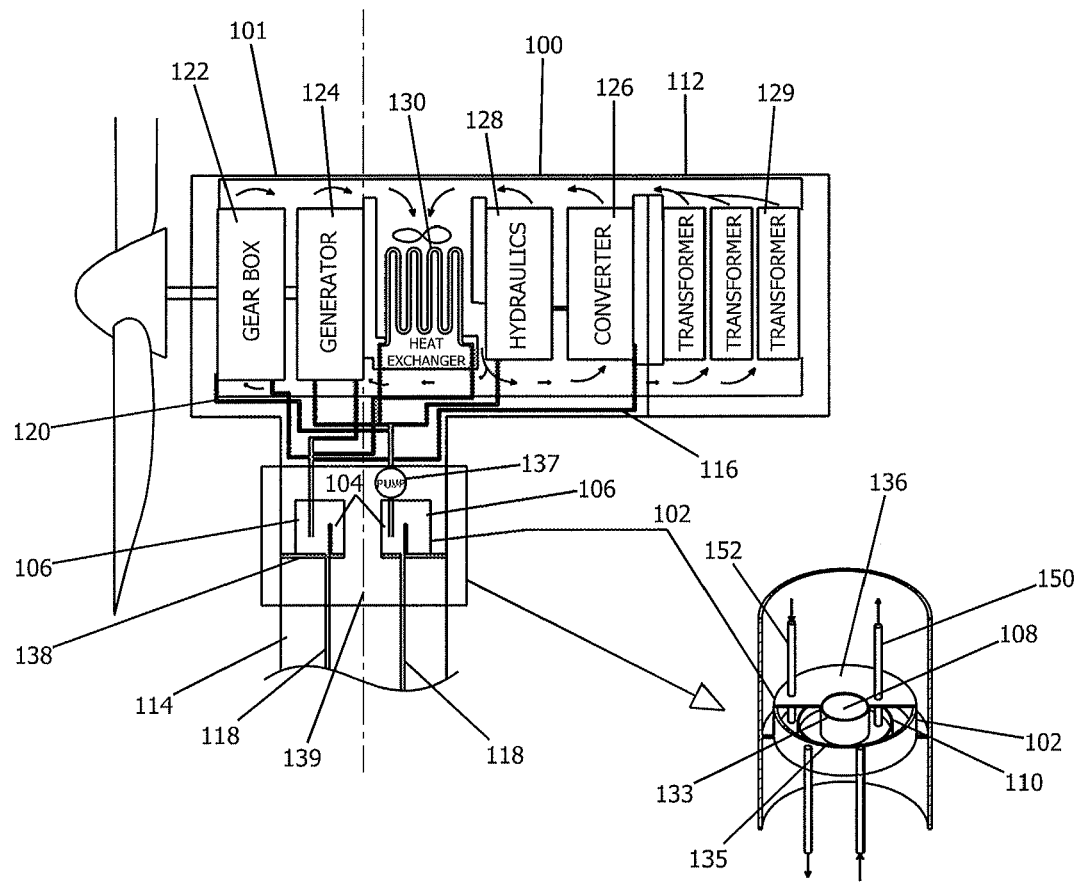
FIG. 1 shows a side elevational view of a first embodiment of the integrated cooling and climate control system of the present invention.
Figure 1A:
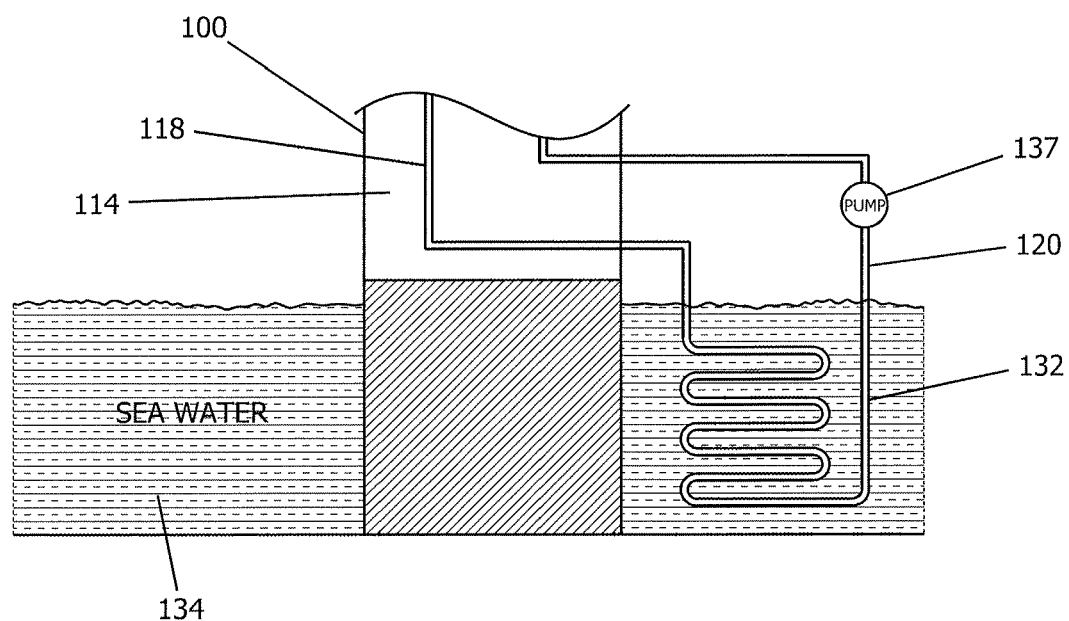
FIG. 1a shows a perspective view of the reservoir inside the turbine tower of the first embodiment of the integrated cooling and climate control system.
Figure 2:
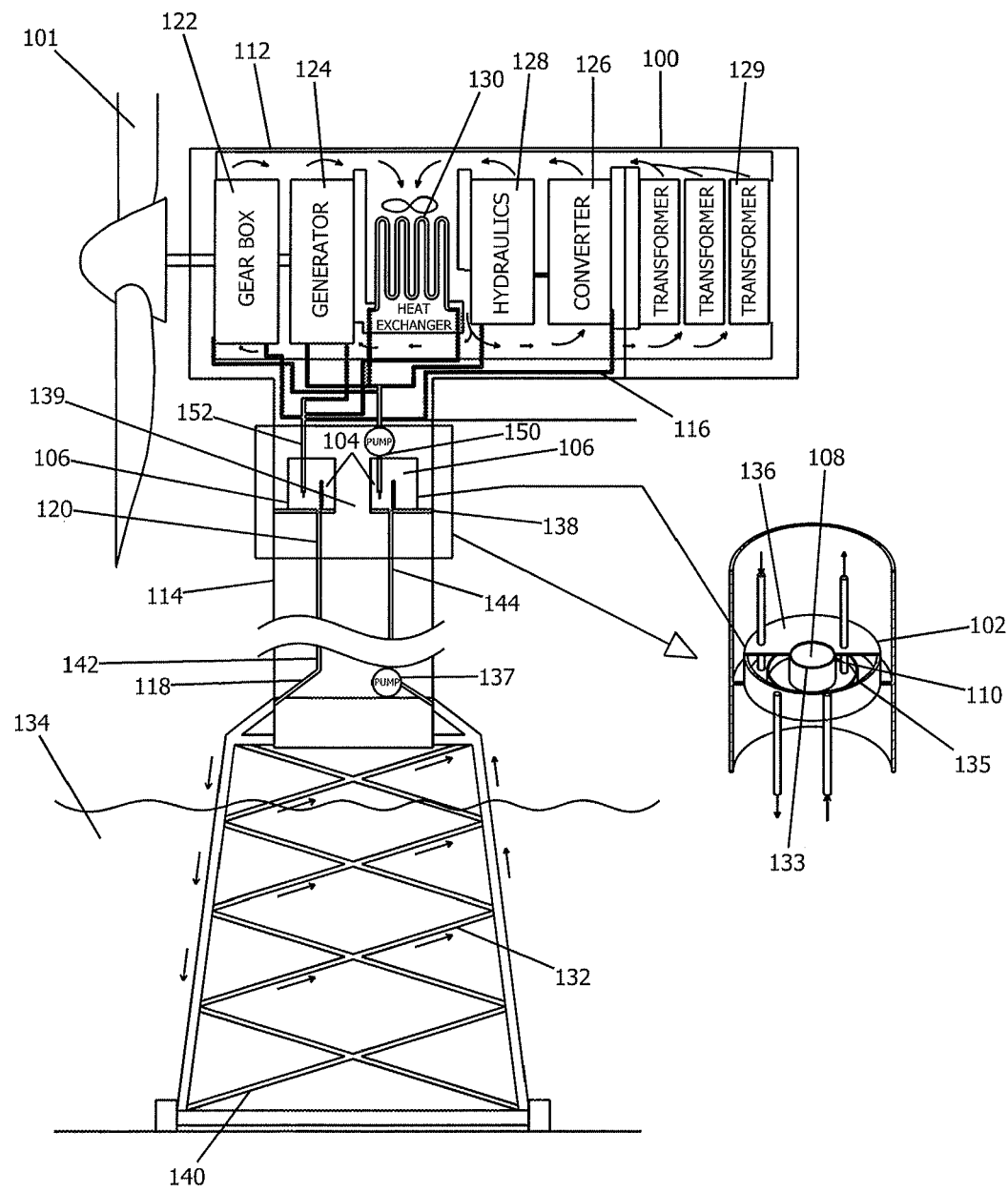
FIG. 2 shows a perspective view of a second embodiment of the integrated cooling and climate control system of the present invention.

FIGS. 1, 1a, and 2 show the integrated cooling and climate control system 100 for an offshore wind turbine 101 according to embodiments of the present invention. The system 100 comprises a reservoir 102 having first 104 and second 106 chambers. The reservoir 102 is preferably positioned in an upper region of the tower 114 of the wind turbine 101 just below the nacelle 112.

The integrated cooling and climate control system 100 comprises an upper cooling circuit 116 formed by a series of pipes which extend upwardly from the reservoir 102 through the nacelle 112 and then downwardly back to the reservoir. The integrated cooling and climate control system 100 is adapted to distribute a coolant fluid 120 from a first chamber 104 of the reservoir 102 through the nacelle 112 to the second chamber 106 of the reservoir. As the coolant fluid 120 in the upper cooling circuit 116 travels through the nacelle 112, the coolant passes the heat generating structures in the nacelle and extracts heat from each of these structures in the nacelle 112. As an example, the coolant fluid 120 may travel through a coolant-to-oil heat exchanger associated with the drivetrain 122, the generator 124, the converter 126, a coolant-to-hydraulic fluid heat exchanger associated with hydraulic fluid of the hydraulic system 128, one or more transformers 129, and a coolant-to-air heat exchanger 130 which collects heat from the nacelle air. The heated coolant 120 then travels to the second chamber 106 of the reservoir 102. The cooled air from the coolant-to-air heat exchanger 130 is preferably directed onto the outer surfaces of the drivetrain 122, generator 124, the converter 126, and one or more transformers 129 by blowers or other means known in the art. This helps remove the heat dissipation to the air from these components.

The integrated cooling and climate control system 100 also features a lower cooling circuit 118 formed by a series of pipes which extend downwardly from said second chamber 106 to a lower portion of the wind turbine 101 where it then extends upwardly back to the first chamber 104. The integrated cooling and climate control system 100 is adapted to distribute the heated coolant fluid 120 from the second chamber 106 of the reservoir 102 through a heat exchange zone 132 that is thermally connected to sea water 134. The sea water 134 serves as a heat sink by surrounding the pipes of the lower cooling circuit 118 in the heat exchange zone 132 and causing heat from the coolant fluid 120 to be transferred to the cold sea water. The integrated cooling and climate control system 100 is then adapted to transfer the cooled coolant fluid 120 in the lower cooling circuit 118 from the heat exchange zone 132 upwardly to the first chamber 104 of the reservoir 102.

The positioning of the lower cooling circuit 118 below the upper cooling circuit 116 causes coolant to naturally flow through the heat exchange zone 132 of the lower cooling circuit. In the upper cooling circuit, the coolant flows from the first chamber 104 to the second chamber 106 through the heat generating components in the nacelle. The hydraulic head arising from the excess coolant in the second chamber 106 thus naturally forces the coolant to circulate through the lower cooling circuit 118 to the first chamber 104. Thus the warm coolant from the second chamber 106 flows through the lower cooling circuit 118, where heat is removed from it by the sea water 134 in the heat exchange zone and the cold coolant then flows back to the first chamber 104. A pump 137 may be implemented to help transfer the coolant fluid 120 from the lower cooling circuit 118 to the reservoir 102. Furthermore, to vary the volume and pressure of the coolant fluid 120 throughout the system 100 various flow restriction valves and additional pumps may be positioned at various points in the system.

The heat exchanger 132 of the lower cooling circuit may have fins to increase the amount of heat transferred to the sea water 134. The fins may be on the interior surface of the pipes which contacts the coolant 120 or the exterior surface of the pipes which contacts the sea water 134. The coolant 120 may be a mixture of ethylene glycol and water or any other suitable liquids known in the art which is freeze resistant.

In a preferred embodiment shown in FIGS. 1 and 1a, the reservoir 102 is annular and has a hollow center 108. The reservoir has a circular wall 110 which separates the reservoir into first 104 and second 106 chambers. For instance, in FIG. 1, the first chamber 104 comprises the inner annular chamber formed by the circular wall 110 and the second chamber 106 comprises the outer annular chamber formed by the circular wall. The circular wall 110 preferably is configured so that one or more passages exist in the reservoir which fluidly connects the first 104 and second 106 chambers. For instance, as shown in FIG. 1a, the circular wall 110 may have a lower height than the inner wall 133 of the first chamber 104 and the outer wall 135 of the second chamber 106 (and any lid associated with the reservoir) so that a coolant overflow path is formed between the second and first chambers over the wall separating the two chambers. This flow path also allows the coolant fluid 120 from the chamber with the higher fluid level to be displaced into the other chamber when the reservoir is tilted.

The reservoir 102 preferably has a lid 136. The lid 136 is configured to cover the top of the reservoir and preferably has a hollow center dimensioned to match the hollow center of the reservoir 102.

In a preferred embodiment, the reservoir 102 is positioned on a platform 138 inside the tower 114 of the wind turbine. The platform 138 has an aperture 139 on the surface which supports the reservoir 102. The hollow center 108 of the reservoir 102 and the corresponding aperture 139 of the platform 138 provide an access path between the nacelle 112 and the tower of the wind turbine. Accordingly, electrical lines may be routed through the hollow center 108 of the reservoir 102 and the aperture 139 of the platform (and the hollow center of any associated lid) in order to extend from the nacelle to the tower bottom of the wind turbine. In certain embodiments where the reservoir's 102 outer diameter is smaller than the tower's inside diameter, additional access paths from the tower to the nacelle can be created through openings in the platform 138 in the space between the reservoir 102 and the tower inside.

The inlet and outlet pipes 150, 152 of the upper cooling circuit extend through openings in the reservoir lid and are adapted to freely hang inside the reservoir chambers so that they may be displaced as the wind turbine moves. Accordingly, as the nacelle 112 yaw along axis Y to direct the rotor towards the wind direction, these inlet and outlet pipes freely rotate inside their respective reservoir chambers along with the reservoir lid 136. The freely hanging configuration of the inlet and outlet pipes 150, 152 within the reservoir 102 allows the system 100 to effectively circulate the coolant 120 within the system 100 even when the nacelle 112 is yawing.

In an alternative embodiment shown in FIG. 2, the foundation of the wind turbine is a jacket foundation. A jacket foundation has support structures 140 comprised of a plurality of tubular steel supports. In this embodiment, the cooling and climate control system is integrated with the jacket foundation such that the support structures 140 serve as the pipes for the lower cooling circuit 118. As shown in FIG. 2, an outlet pipe 142 extends from the second chamber 104 to the support structures 140. The coolant fluid 120 is transferred from the support pipes 140 to an inlet pipe 144 of the first chamber. The system is adapted to transfer the fluid through an upper cooling circuit 116 and a lower cooling circuit 118 as described for the first embodiment of the system. Since all but the uppermost support pipes 140 are underwater, the pipes will serve to transfer the heat from the heated coolant fluid to the sea water 134.

In the embodiments shown in FIGS. 1, 1a, and 2, the wind turbine 101 is preferably sealed and maintained in a slight overpressure condition to minimize the volume of ambient air entering the nacelle 112. In order to avoid corrosion, the lower portion of the wind turbine 101 receives ambient air which preferably has water droplets and salt particles removed by a water conditioning unit. The air received on the lower portion of the wind turbine is preferably treated so that the temperature and level of water vapor of the air is adjusted to provide an optimum relative humidity of the air inside the wind turbine. The treated air is then transferred to the nacelle 112 to compensate for the small volume of air entering the nacelle 112 due to the high pressure in the nacelle.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Furthermore, the purpose of the foregoing Abstract is to enable the U.S. patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

Having described the invention, what is claimed as new and secured by Letters Patent is:

1. An integrated cooling and climate control system for an offshore wind turbine comprising:
    a reservoir having a first and second chamber wherein:
        a plurality of pipes are connected to said first chamber to form an upper cooling circuit which distributes a coolant fluid from said first chamber through heat-generating structures in a nacelle to said second chamber; and
        a plurality of pipes are connected to said second chamber to form a lower cooling circuit which distributes the coolant fluid from said second chamber through a heat exchange zone to said first chamber;
    wherein the lower cooling circuit in said heat exchange zone is thermally connected to sea water which serves as a heat sink for heat collected by said coolant fluid in the upper cooling circuit;
    wherein said system has rotating means to allow pipes connecting the reservoir to the upper cooling circuit to rotate as the nacelle yaws whereby effective circulation of the coolant fluid is maintained when the nacelle yaws;
    wherein said reservoir is annular and has a hollow center, and an annular divider wall separates the reservoir into said first and second chambers;
    wherein said annular divider wall is dimensioned to provide an overflow passage between said first and second chambers wherein said passage is adapted to permit coolant fluid to flow between said chambers when the reservoir is tilted.

2. The system of claim 1 wherein said heat generating structures comprise a liquid-to-liquid heat exchanger that is associated with a lubricating oil of a drivetrain of said wind turbine, a liquid-to-liquid heat exchanger that is associated with a hydraulic fluid sump of a hydraulic system of said wind turbine, an air-to-liquid heat exchanger located in the nacelle which collects heat from the air inside the nacelle, at least one generator, at least one converter, and at least one transformer.

3. The system of claim 2 wherein at least one blower is used to help direct the air inside the nacelle to the air-to-liquid heat exchanger and at least one blower is used to help direct the cooled air exiting the air-to-liquid heat exchanger to heat generating components in the nacelle or areas of the nacelle having an excess of heat.

4. The system of claim 1, wherein said reservoir has a lid having a hollow center that is aligned with the hollow center of the reservoir.

5. The system of claim 4 wherein
    the hollow center of said reservoir and the reservoir lid have an axis that is coincident with the nacelle yaw axis; and
    inlet and outlet pipes that connect the upper cooling circuit to said reservoir extend through openings in the reservoir lid in a freely hanging manner to permit the reservoir to be displaced as the nacelle yaws.

6. The system of claim 1, wherein said reservoir is located on a platform in an upper region of a tower of the wind turbine just below the nacelle of the wind turbine, said platform having a hollow center coincident with the hollow center of the reservoir.

7. The system of claim 1 wherein at least one pump is connected to a cooling circuit to help distribute the coolant fluid.

8. The system of claim 1 wherein said cooling circuits have at least one flow valve and at least one flow restriction device to adjust the flow of the coolant fluid.

9. The system of claim 1 wherein one or more pipes of the heat exchange zone have at least one fin to increase the level heat dissipated from said heat exchange zone to said sea water.

10. The system of claim 1 wherein:
said wind turbine has a foundation comprised of a jacket structure having a plurality of support tubes; and
said support tubes are connected to said reservoir and are adapted to serve as the lower cooling circuit of said system whereby portions of said tubes of the jacket structure thermally connected with sea water serve as the heat-exchange zone.

11. The system of claim 1 wherein said wind turbine is sealed and maintained at a slight overpressure to minimize ambient air leakage into the turbine.

12. The system of claim 1 wherein:
said upper cooling circuit directs coolant upwardly into said nacelle from said upper region of the tower and then directs said coolant downward to said second chamber; and
said lower cooling circuit directs coolant downwardly to said heat exchange zone and then directs said coolant upwardly to said first chamber,
wherein gravity directs excess volume of coolant fluid to the lower cooling circuit and hydraulic pressure generated by said excess fluid pushes the fluid upwardly to said reservoir.

13. An integrated cooling and climate control system for an offshore wind turbine comprising:
a reservoir having a first and second chamber wherein:
a plurality of pipes are connected to said first chamber to form an upper cooling circuit which distributes a coolant fluid from said first chamber through heat-generating structures in a nacelle to said second chamber; and
a plurality of pipes are connected to said second chamber to form a lower cooling circuit which distributes the coolant fluid from said second chamber through a heat exchange zone to said first chamber;
wherein the lower cooling circuit in said heat exchange zone is thermally connected to sea water which serves as a heat sink for heat collected by said coolant fluid in the upper cooling circuit;
wherein said reservoir is annular and has a hollow center;
wherein said reservoir has a lid having a hollow center that is aligned with the hollow center of the reservoir.

14. An integrated cooling and climate control system for an offshore wind turbine comprising:
a reservoir having a first and second chamber wherein:
a plurality of pipes are connected to said first chamber to form an upper cooling circuit which distributes a coolant fluid from said first chamber through heat-generating structures in a nacelle to said second chamber; and
a plurality of pipes are connected to said second chamber to form a lower cooling circuit which distributes the coolant fluid from said second chamber through a heat exchange zone to said first chamber;
wherein the lower cooling circuit in said heat exchange zone is thermally connected to sea water which serves as a heat sink for heat collected by said coolant fluid in the upper cooling circuit;
wherein said wind turbine has a foundation comprised of a jacket structure having a plurality of support tubes; and
wherein said support tubes are connected to said reservoir and are adapted to serve as the lower cooling circuit of said system whereby portions of said tubes of the jacket structure thermally connected with sea water serve as the heat-exchange zone.

\* \* \* \* \*

UNITED STATES PATENT AND TRADEMARK OFFICE
CERTIFICATE OF CORRECTION

PATENT NO. : 9,091,249 B2  
APPLICATION NO. : 13/489086  
DATED : July 28, 2015  
INVENTOR(S) : Peri Sabhapathy et al.

Page 1 of 1

It is certified that error appears in the above-identified patent and that said Letters Patent is hereby corrected as shown below:

Title page, Item (73), Assignee: "GAMES" should read --GAMESA--.

Signed and Sealed this
Twelfth Day of January, 2016

Michelle K. Lee
*Director of the United States Patent and Trademark Office*